United States Patent
Saka et al.

(10) Patent No.: US 8,054,509 B2
(45) Date of Patent: Nov. 8, 2011

(54) IMAGE PROCESSING APPARATUS, IMAGE PROCESSING METHOD, AND IMAGE PROCESSING PROGRAM

(75) Inventors: Masaaki Saka, Toyohashi (JP);
Kazuhiro Ishiguro, Toyohashi (JP);
Hiroyuki Suzuki, Toyokawa (JP);
Hideyuki Toriyama, Toyokawa (JP);
Hiroshi Murakami, Nagoya (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 658 days.

(21) Appl. No.: 12/145,806

(22) Filed: Jun. 25, 2008

(65) Prior Publication Data

US 2009/0015858 A1    Jan. 15, 2009

(30) Foreign Application Priority Data

Jul. 10, 2007    (JP) ................................. 2007-180964

(51) Int. Cl.
*H04N 1/40* (2006.01)
*H04N 1/46* (2006.01)
*G06K 9/00* (2006.01)
(52) U.S. Cl. .................. 358/3.28; 358/537; 382/100
(58) Field of Classification Search .................. None
See application file for complete search history.

(56) References Cited

U.S. PATENT DOCUMENTS

| | | | | |
|---|---|---|---|---|
| 7,373,513 B2 * | 5/2008 | Levy | ............................. | 713/176 |
| 7,830,543 B2 * | 11/2010 | Maki | ............................. | 358/1.18 |
| 2005/0078331 A1 | 4/2005 | Guan et al. | | |
| 2005/0219634 A1 * | 10/2005 | Murakami | ................... | 358/3.28 |

FOREIGN PATENT DOCUMENTS

| | | |
|---|---|---|
| JP | 6-022119 A | 1/1994 |
| JP | 2004-274092 A | 9/2004 |
| JP | 2005-199486 A | 7/2005 |

OTHER PUBLICATIONS

Notification of Reason(s) for Refusal, Japanese Application No. 2007-180964, dated Jun. 30, 2009.

* cited by examiner

*Primary Examiner* — Twyler Haskins
*Assistant Examiner* — Barbara Reinier
(74) *Attorney, Agent, or Firm* — Buchanan Ingersoll & Rooney PC

(57) ABSTRACT

The image processing apparatus of the present invention includes: a specific pattern detecting unit which detects a background pattern representing additional information from inputted original document image data; an information detecting unit which extracts the additional information represented by the background pattern which is detected by the specific pattern detecting unit; an erase processing unit which erases a prescribed region of the original document image and outputs erase-processed document image data; a re-embedding background pattern generating unit which generates a re-embedding background pattern representing the additional information extracted by the information detecting unit; a background pattern composition processing unit which embeds the re-embedding background pattern into the erase-processed document image data and outputs re-embedded document image data; and a processor which controls the units mentioned above. The apparatus of the present invention is capable of embedding the background pattern again, which has once been lost through the erase function, so as to maintain a background pattern detection rate at a high level.

24 Claims, 15 Drawing Sheets

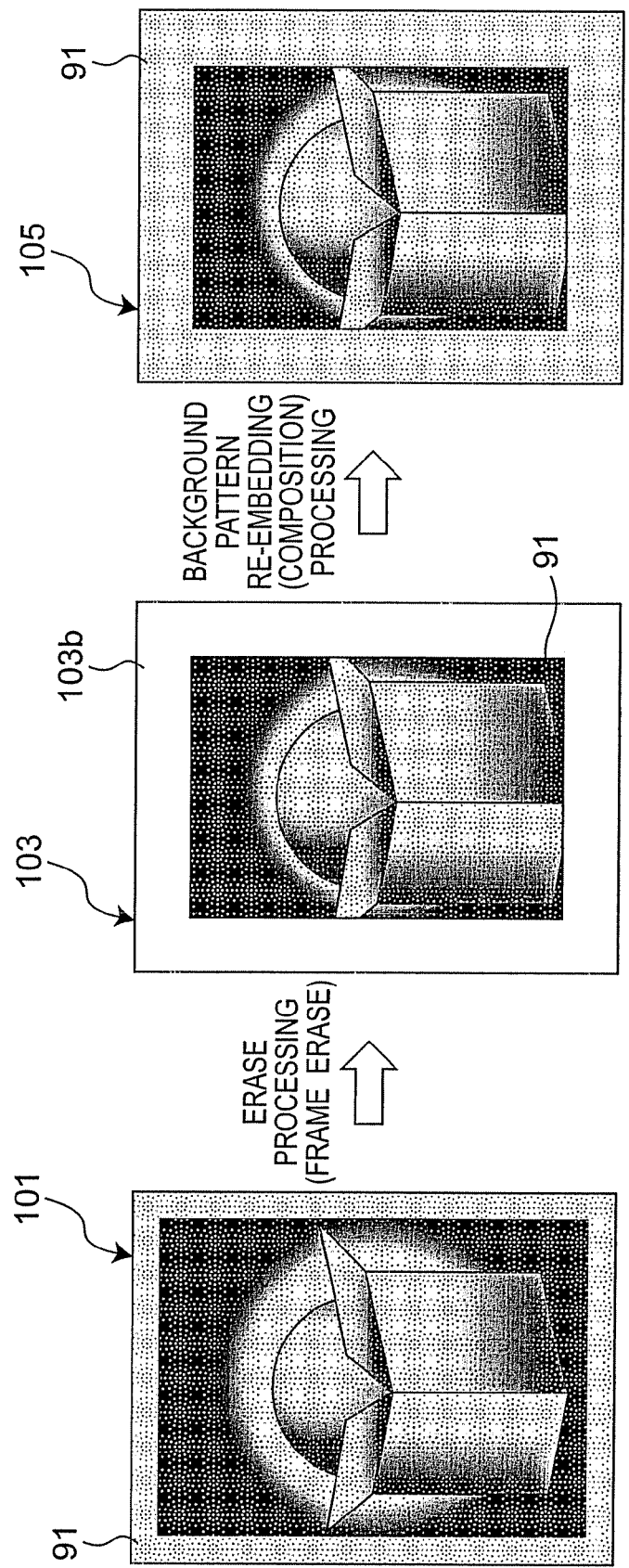

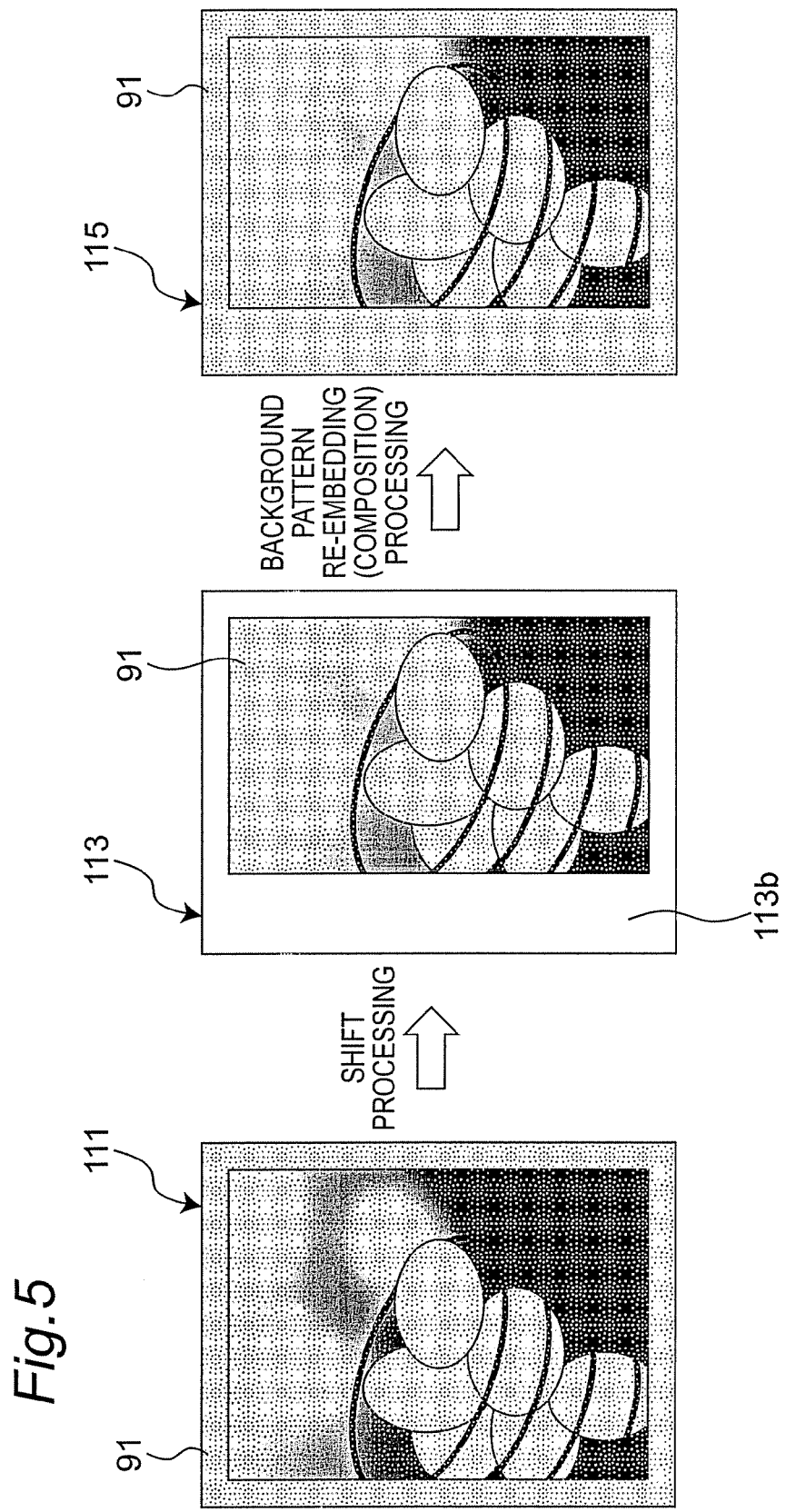

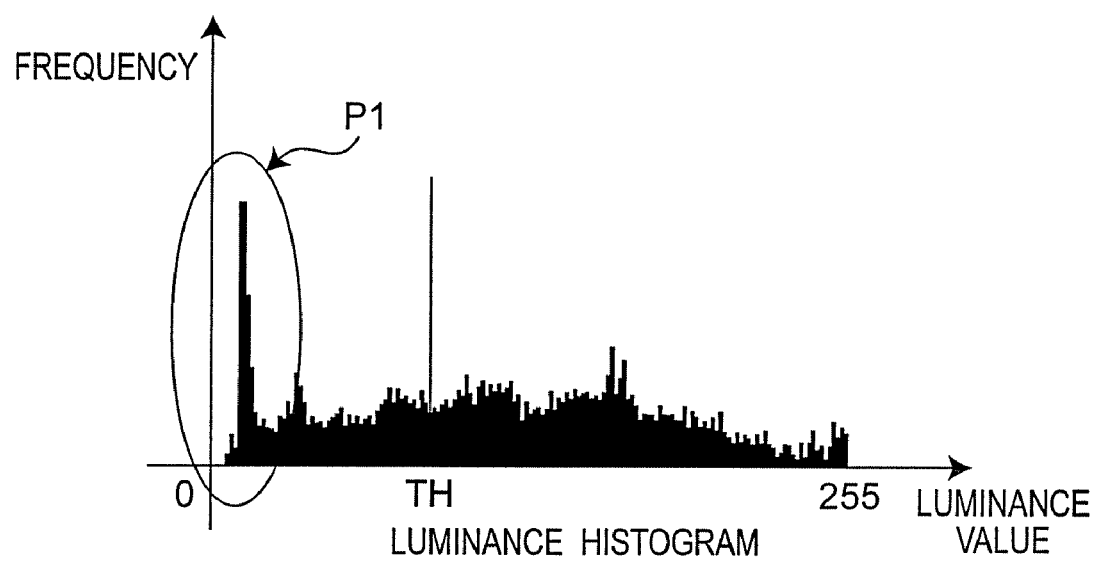

RED LIGHT INTENSITY HISTOGRAM

GREEN LIGHT INTENSITY HISTOGRAM

BLUE LIGHT INTENSITY HISTOGRAM

IMAGE PROCESSING APPARATUS, IMAGE PROCESSING METHOD, AND IMAGE PROCESSING PROGRAM

This application is based on an application No. 2007-180964 filed in Japan, the contents of which are hereby incorporated by reference.

BACKGROUND OF THE INVENTION

1. Field of the Invention

The present invention relates to an image processing apparatus, an image processing method, and an image processing program, and particularly relates to an image processing apparatus, an image processing method, and an image processing program for processing a background pattern representing additional information.

2. Description of the Related Art

Along with widespread use of digitized image information and development of image information processing technique in recent years, an image processing apparatus has achieved a remarkable development. Such a development results in the image processing apparatus (so-called a MultiFunction Peripheral (MFP), a Scan Print Copy (SPC), or an All In One (AIO)) which is equipped with functions of devices such as a copying machine, a printer, a facsimile, and an image scanner by itself. The image processing apparatus of this type has already been commercialized and even now the market of this apparatus is still expanding.

With further improvement of quality in performance and spread of the image processing apparatuses, a copy (such as electronic data, printed matters) which is substantially same as an original document can be prepared more easily than ever before. Therefore, problematic incidents from a viewpoint of information management have been frequently reported. Such incidents involve problems of diffusion and loss of information, with which information copying using the image processing apparatus is assumed to be involved. In response to demands from the market, several prior arts are developed. Below, those prior arts are described.

JP 06-022119 A discloses an image processing apparatus which is capable of identifying the document which requires security protection. This image processing apparatus can embed additional information which is used to identify the document, and also can read out and extract the embedded additional information. When the image processing apparatus duplicates the document in which the additional document is embedded, the image processing apparatus can count up the total number of the copy of the document according to the extracted additional information and duplicates the document with embedding second additional information in the duplicate based on the extracted additional information.

The image processing apparatus of JP 06-022119 A having above mentioned configuration is capable of identifying correspondence between a copied material and a specific material, a person who has copied the material, and the like so that this provides an effect of preventing a document from being copied illegally.

JP 2004-274092 A also discloses an image processing apparatus which is capable of identifying the document which requires maintaining its confidentiality. The image processing apparatus detects a background pattern embedded in background parts of the image of the document, and compares the detected background pattern with a prescribed and stored output prohibition pattern, and prohibits the output of the image of the document when the comparison results in matching.

The image processing apparatus disclosed in JP 2004-274092 A can also provide an effect of preventing a document from being illegally copied.

Both of the two image processing apparatuses mentioned above controls the duplication of a document by embedding the pattern representing predetermined additional information into the document. Typically, this pattern is quietly embedded in a predetermined area of a document in a format where a user can hardly understand the meaning of the information which the pattern represents. The area into which the pattern is embedded may be an arbitrary part of the document. However, an area having a monotonous color tone and a faint color is suitable for the pattern to be detected. In many cases, the suitable area is a peripheral edge part of a document.

However, an image processing apparatus typically has erase functions as optional functions of the copy function such as frame erase, fold line erase (center erase), and out-of-the-document-boundary erase. When copying a document with those erase functions, the background pattern embedded in the peripheral edge part or the central part of the document is also simultaneously erased.

As described above, the background pattern can be embedded and detected even in the area other than the peripheral edge part and the central part of the document. However, a problematic deterioration of the detection rate of the background pattern occurs when the background pattern embedded in the area such as the peripheral edge part is lost by the erase function since the peripheral edge part is advantageous for the embedded background pattern to be detected.

Other objects and further features of the present invention will be apparent from the following detailed description when read in conjunction with the accompanying drawings.

SUMMARY OF THE INVENTION

It is an object of the present invention to provide an image processing apparatus which embeds the background pattern again in the area where the originally embedded background pattern is erased by the erase function so that the background pattern detection rate be maintained at high level.

The object described above is achieved by an image processing apparatus according to an aspect of the present invention. The image processing apparatus includes: a specific pattern detecting unit which detects a background pattern representing additional information from inputted original document image data; an information detecting unit which extracts the additional information represented by the background pattern which is detected by the specific pattern detecting unit; an erase processing unit which erases a prescribed region of the original document image and outputs erase-processed document image data; a re-embedding background pattern generating unit which generates a re-embedding background pattern representing the additional information extracted by the information detecting unit; a background pattern composition processing unit which embeds the re-embedding background pattern into the erase-processed document image data and outputs re-embedded document image data; and a processor which is connected so as to transmit and receive data to/from the specific pattern detecting unit, the information detecting unit, the erase processing unit, the re-embedding background pattern generating unit, and the background pattern composition processing unit, and controls the specific pattern detecting unit, the information detecting unit, the erase processing unit, the re-embedding background pattern generating unit, and the background pattern composition processing unit.

The object described above is also achieved by a method of re-embedding a background pattern according to another aspect of the present invention. The method of re-embedding the background pattern includes: detecting a background pattern representing additional information from inputted original document image data; extracting the additional information represented by the detected background pattern; erasing a prescribed region of the original document image and generating erase-processed document image data; generating a re-embedding background pattern representing the additional information; and embedding the re-embedding background pattern into the erase-processed document image data and outputting re-embedded image data.

The object described above is also achieved by an image processing computer program stored on a computer readable medium for re-embedding a background pattern in image data inputted into an image processing apparatus which includes the computer. The computer program stored on a computer readable medium includes: code which detects a background pattern representing additional information from inputted original document image data; code which extracts the additional information represented as the background pattern detected by the specific pattern detection; code which erases a prescribed area of the original document image and outputs erase-processed document image data; code which generates a re-embedding background pattern representing the additional information extracted by the additional information extraction; and code which embeds the re-embedding background pattern in the erase-processed document image data and outputs re-embedded document image data.

The image processing apparatus according to the present invention executes processing of embedding the background pattern again in the area where the background pattern is erased. The background pattern to be embedded is the background pattern which has been included in the original document image and has been damaged through the erase processing. Thus, the image processing apparatus according to the present invention exhibits an advantage of providing an output having a background pattern detection rate equal to or higher than that of the original document image, thus preventing the additional information represented as the background pattern from being damaged through the copy processing with the erase processing, thereby preventing a decrease of the background pattern detection rate thereof.

Other objects and further features of the present invention will be apparent from the following detailed description when read in conjunction with the accompanying drawings.

BRIEF DESCRIPTION OF THE DRAWINGS

FIG. 4 is an outline diagram of erase processing and background pattern re-embedding processing;

FIG. 5 is an outline diagram of the erase processing, shift processing, and the background pattern re-embedding processing;

FIG. 8 is a diagram of an example of a luminance value histogram used in a document image characteristic analysis;

DETAILED DESCRIPTION OF THE PREFERRED EMBODIMENTS

An image processing apparatus according to the present invention includes an information processing apparatus such as a computer, and is capable of embedding additional information as a background pattern in a document. According to the image processing apparatus of the present invention, the background pattern which once has been erased due to an erase function can be embedded in the document again and can be outputted.

The image processing apparatus of the present invention is a MultiFunction Peripheral having a copy function, for example.

In the present invention, the additional information is, for example, security information that is automatically generated by the image processing apparatus. In this case, the security information is embedded as a background pattern in the document. In addition, the additional information may be optional information which is optionally added by a user. The additional information includes, for example, information of security setting such as date, an ID code or a password of an operator.

In the present invention, the document may be a paper document optically read by the image processing apparatus or electronically inputted image data.

The erase function according to the present invention includes a frame erase function and a center erase function (a fold line erase function), and the like.

The frame erase function is a function of erasing an image of a peripheral region of a document image, which has a prescribed width.

The fold line erase function (center erase function) is a function of erasing an image of a region of a document image, which is in a central part of the document image and has a prescribed width.

Note that the image processing apparatus according to the present invention may have an erase function other than the frame erase function and the center erase function. A person skilled in the art can apply the present invention to the erase function mentioned just above easily and properly.

Below, preferred embodiments according to the present invention will be explained with reference to the accompanying drawings.

Figure 1:
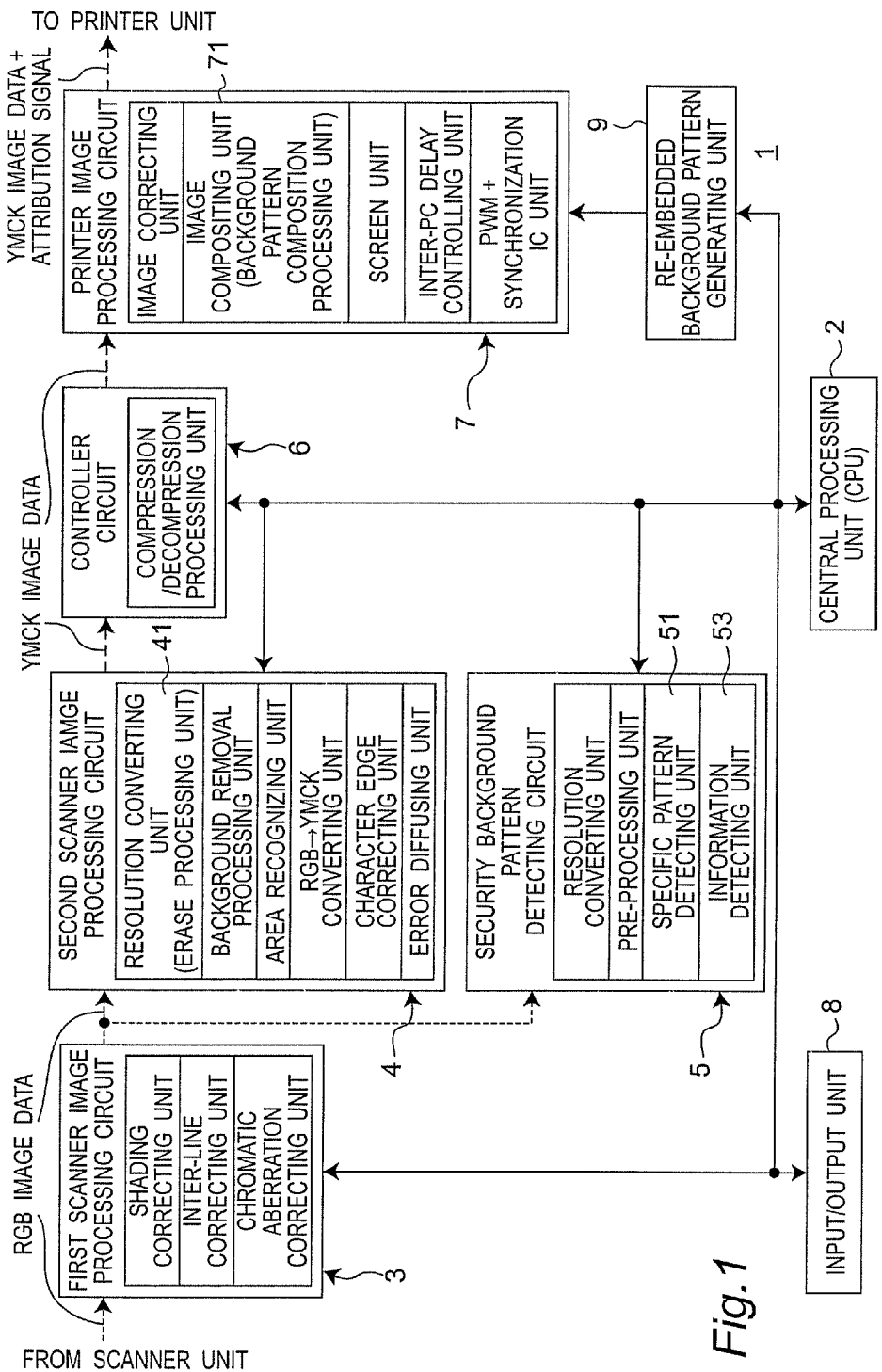
FIG. 1 is a block diagram of a MultiFunction Peripheral 1 according to the present invention.

FIG. 1 is a block diagram of a configuration of an image processing apparatus (MultiFunction Peripheral) 1 according to the present invention. The MultiFunction Peripheral 1 includes a computer and this computer has a central processing unit 2 for controlling the MultiFunction Peripheral 1. The central processing unit 2 executes a program stored in a storage device not shown, and controls an operation of the MultiFunction Peripheral 1.

The central processing unit 2 is connected to: a first scanner image processing circuit 3; a second scanner image processing circuit 4; a security background pattern detecting circuit 5; a controller circuit 6; a printer image processing circuit 7; an input/output unit 8; and a re-embedding background pattern generating unit 9, so that the central processing unit 2 may control those units and circuits.

The first scanner image processing circuit 3 inputs RGB image data from a scanner unit not shown, applies correction processing to the RGB image data such as a shading correction, an inter-line correction, and a chromatic aberration correction, and outputs the corrected RGB image data to the second scanner image processing circuit 4 and the security background pattern detecting circuit 5. The RGB image data may be document image data optically read by the scanner unit of the MultiFunction Peripheral 1, or also may be electronically inputted document image data.

The second scanner image processing circuit 4 inputs the RGB image data, performs processing such as conversion of resolution of the image data, removal of a background color of the image data, conversion to YMCK image data, correction of an edge portion of a character in the document, and error diffusion processing regarding gradation expression of the document, and outputs the YMCK image data to the controller circuit 6. A resolution converting unit (erase processing unit) 41 for performing conversion of the resolution has an erase processing function which performs erase processing (frame erase and center erase, and the like) to the document image data. Therefore, in the case where the erase processing is selected, the YMCK image data outputted from the second scanner image processing circuit 4 is the image data in which data included in a prescribed area of the image is erased. In addition, the resolution converting unit 41 may execute processing of shifting a position of the image in the document.

The security background pattern detecting circuit 5 inputs the RGB image data, and performs detection of the background pattern included in this image data. The security background pattern detecting circuit 5 converts the resolution of the image data and performs prescribed pre-processing, and a specific pattern detecting unit 51 detects a specific pattern (detection of the background pattern), and an information detecting unit 53 decodes the background pattern and outputs obtained additional information to the central processing unit 2.

The controller circuit 6 inputs the YMCK image data, applies compression/expansion processing to this image data, and outputs the YMCK image data to the printer image processing circuit 7.

The printer image processing circuit 7 inputs the YMCK image data, performs a prescribed image correction for this image data if needed, outputs the image data to a printer unit of the MultiFunction Peripheral 1 not shown, and executes printing of the image data. The printer image processing circuit 7 has an image compositing unit (a background pattern composition processing unit) 71. The image compositing unit 71 performs composition of the background pattern for the YMCK image data that has undergone the image correction processing. The image compositing unit 71 inputs the data of an original document image that has undergone the image correction, and can output the YMCK image data (data of the re-embedded document image) in which the background pattern is re-embedded.

The input/output unit 8 is a so-called user interface. The input/output unit 8 includes an output unit (display unit) 81 for presenting information to an operator (see FIG. 2), and an input unit 83 for inputting the information to the MultiFunction Peripheral 1 by the operator (see FIG. 2). Specifically, the input/output unit 8 may have a well-known structure.

The re-embedding background pattern generating unit 9 generates the background pattern (re-embedding background pattern) which is to be embedded in the area of the image from which the image information has been erased due to the erase processing performed by the resolution converting unit 41 (erase processing unit 41). The generated re-embedding background pattern is outputted to the printer image processing circuit 7, and is embedded in the document image by the image compositing unit 71. The re-embedding background pattern may be usually a background pattern representing information substantially same as the information represented by the background pattern originally embedded in the original document. The area in which the re-embedding background pattern is embedded may be an entire surface of an original document, or may be the area of the document that has undergone the erase processing.

Figure 2:
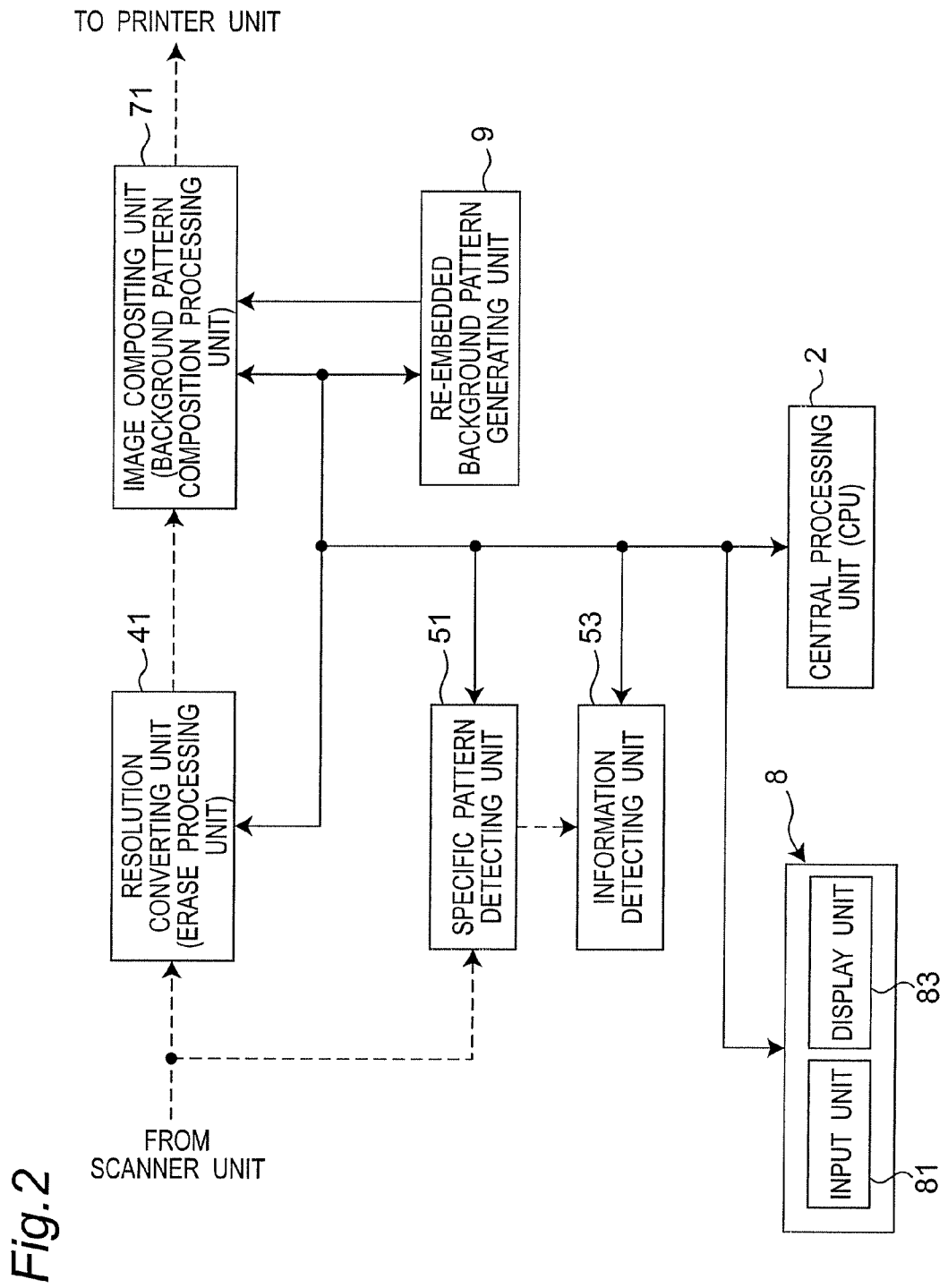
FIG. 2 is a block diagram of an essential part of the MultiFunction Peripheral 1 according to the present invention.

FIG. 2 is a block diagram of essential parts of the present invention. A broken arrow represents a flow of image data, and a solid arrow represents a flow of data and control instructions, and the like.

The central processing unit 2 is connected to each unit constituting the essential part of the MultiFunction Peripheral 1 so that data transfer with one another may be possible, and each unit operates on the basis of a control instruction outputted from the central processing unit 2.

The image data of the original document scanned by the scanner unit not shown are sent to the erase processing unit 41 and the specific pattern detecting unit 51 in the form of RGB data.

The specific pattern detecting unit 51 analyzes the RGB data, and determines whether or not the background pattern is embedded in the original document. The result of the determination is sent to the central processing unit 2, and the detected background pattern is sent to an information detecting unit 53.

Figure 3:
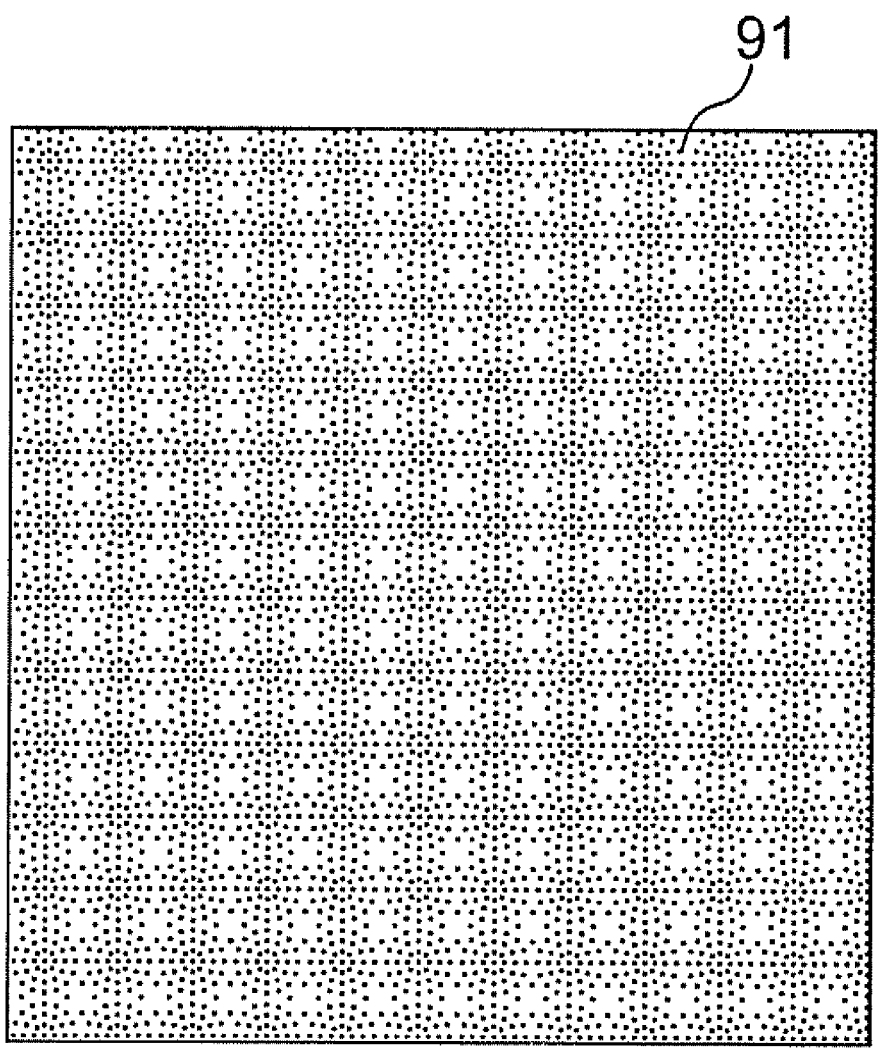
FIG. 3 is a diagram of an example of a background pattern.

FIG. 3 is a diagram illustrating a background pattern 91. The background pattern 91 represents prescribed additional information with an arrangement of dots of background pattern constitutional units, each of which has a prescribed shape and size. When an existence of the background pattern 91 is detected, the specific pattern detecting unit 51 sends a configuration of the background pattern 91 to the information detecting unit 53, and the information detecting unit 53 extracts the additional information from the background pattern 91 and outputs the additional information to the central processing unit 2.

When FIG. 2 is referenced again, the central processing unit 2 can receive an operator's erase processing instruction through the input/output unit 8. In the case where: the instruction of the erase processing is provided; a report of detecting the background pattern from the specific pattern detecting unit 51 is received; and the content of the additional information represented by this background pattern is received from the information detecting unit 53, the central processing unit 2 gives an instruction to the re-embedding background pattern generating unit 9 to generate the background pattern representing the content of the additional information, and gives an instruction to the background pattern composition processing unit 71 to embed the re-embedding background pattern generated by the re-embedding background pattern generating unit 9 in the document image data received from the erase processing unit 41, and outputs the re-embedded data of the document image to the printer unit not shown.

FIG. 4 is a diagram of an outline of a background pattern re-embedding process performed by the MultiFunction Peripheral 1. The original document image data 101 scanned by the scanner unit is shown at the leftmost part in the figure. The original document image data 101 is a scanned image of the document in which the background pattern 91 is embedded. The erase processing unit 41 applies the erase processing to the original document image data 101. Erase-processed document image data 103 is shown in a central part of the figure. In this figure, the document image data that has undergone the frame erase processing is shown as an example of the erase processing. In the periphery of the document image, an area of a prescribed width (normal width), a blank area 103*b*, is erased. The image compositing unit 71 receives the erase-processed document image data 103, and embeds the re-embedding background pattern 91 received separately from the re-embedding background pattern generating unit 9 in the erase-processed document image data 103, and generates the re-embedded document image data 105.

Thus, by re-embedding (embedding again) the additional information (namely, the background pattern) of the original document in the blank area after the erase processing, the image processing apparatus (MultiFunction Peripheral 1) according to the present invention is capable of maintaining the background pattern detection rate to be equal to that of the original document.

The detection rate of the background pattern is maintained to be equal to that of the original document. When the additional information includes security information, worry about leakage of confidential information can be vanished.

FIG. 5 is a diagram of another example of the re-embedding of the background pattern.

In this example, the process of the re-embedding of the background pattern in the case where the erase processing and document shift processing are simultaneously applied to the document is exemplified. The original document image data 111 is a scanned image of the document in which the background pattern is embedded. The erase processing unit 41 applies the erase processing and the document shift processing to the original document image data 111. Erase-processed and shift-processed document image data 113 that has undergone the erase processing and the document shift processing is shown in the central part of the figure. The image of the erase-processed and shift-processed document image data 113 is right shifted compared to the original document image data 111, and a blank area 113*b* is newly generated by the erase processing and the document shift processing. The image compositing unit 71 receives the erase-processed and shift-processed document image data 113, embeds the re-embedding background pattern 91 received separately from the re-embedding background pattern generating unit 9 in the erase-processed and shift-processed document image data 113, and generates re-embedded document image data 115.

Thus, the MultiFunction Peripheral 1 according to the present invention re-embeds (embeds again) the re-embedding background pattern which is substantially equal to the background pattern included in the original document in a prescribed area which includes the blank area 113*b* generated by the erase processing and the document shift processing. Hence, the detection rate of the background pattern can be made higher than or equal to that of the original document, at least.

Further, the MultiFunction Peripheral 1 according to the present invention is capable of analyzing the image characteristic of the original document and generating a re-embedding background pattern on the basis of the analysis for the characteristic of the image of the original document. The re-embedding background pattern generated has the density and color tone, and the like which are determined according to the characteristics of the original document image such as density and color tone, and the like of the background color, for example. Therefore, it is possible to realize the background pattern detection rate higher than that of the original document image.

In addition to the instruction to perform the re-embedding of the background pattern, the operator can give instructions to the MultiFunction Peripheral 1 to perform a background pattern automatic correction processing on the density and color tone, and the like of the re-embedding background pattern and an enlargement processing of an area to be erased.

Figure 6A:
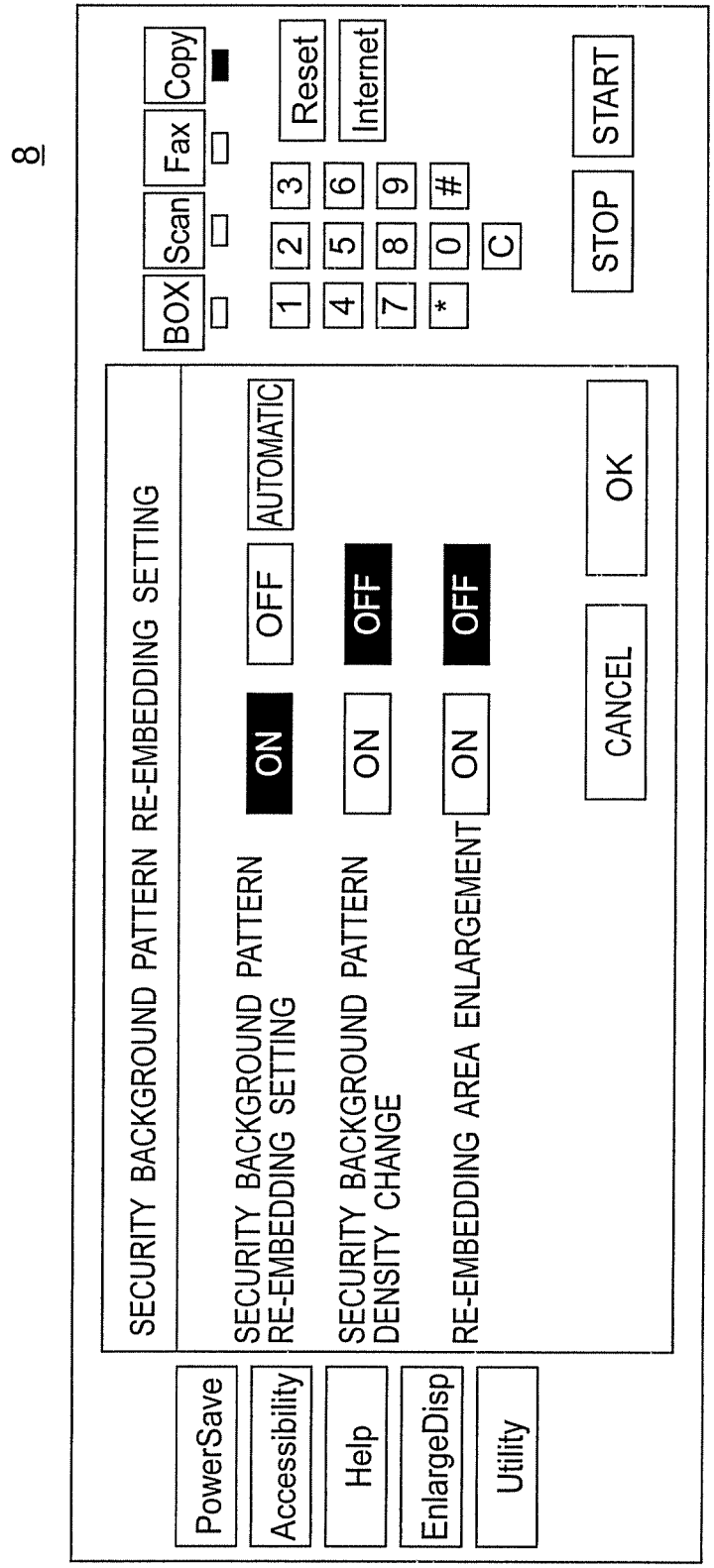
FIG. 6A is a diagram of a design example of an input/output unit 8 of the MultiFunction Peripheral 1.

FIG. 6A is a diagram of a design example of the input/output unit 8. The input/output unit 8 can be constituted with a liquid crystal display touch panel, and the operator can input the instruction to the MultiFunction Peripheral 1, by touching on a button displayed on a liquid crystal display.

"Security background pattern re-embedding setting" is a button for setting whether or not the background pattern having been erased by the erase processing is re-embedded.

In addition, the input/output unit 8 has a setting button for "security background pattern density change" and "re-embedding area enlargement". When the "security background pattern density change" is "ON," the MultiFunction Peripheral 1 detects and analyzes the background color and the like of the original document image, and based on this analysis, corrects the density and color tone, and the like of the re-embedding background pattern, and executes background pattern re-embedding. When the "re-embedding area enlargement" is "ON," the MultiFunction Peripheral 1 enlarges the area to be erased through the erase processing so as to be larger than the area of normal setting. Thus, the detection rate of the background pattern can be further improved.

Figure 6B:
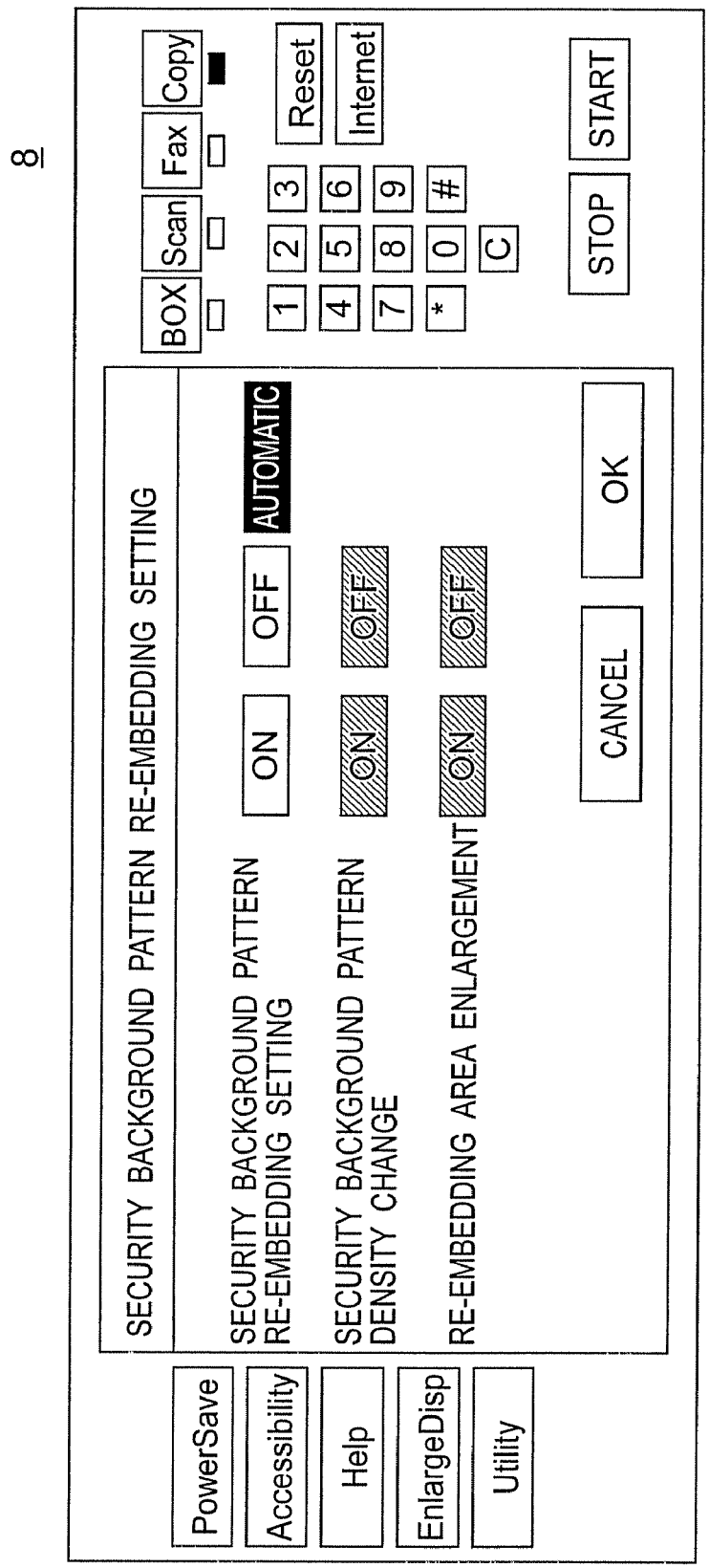
FIG. 6B is a diagram of a display example of the input/output unit 8 when a setting of the background pattern re-embedding is "automatic"

FIG. 6B is a diagram of a display example of the input/output unit 8 in the case where the "security background pattern re-embedding setting" is set to "automatic." In this case, the "security background pattern density change" and the "re-embedding area enlargement" are automatically set to "ON" only under a prescribed condition, based on a result obtained by analyzing the original document image, and in other case, they are set to "OFF."

Figure 7A:
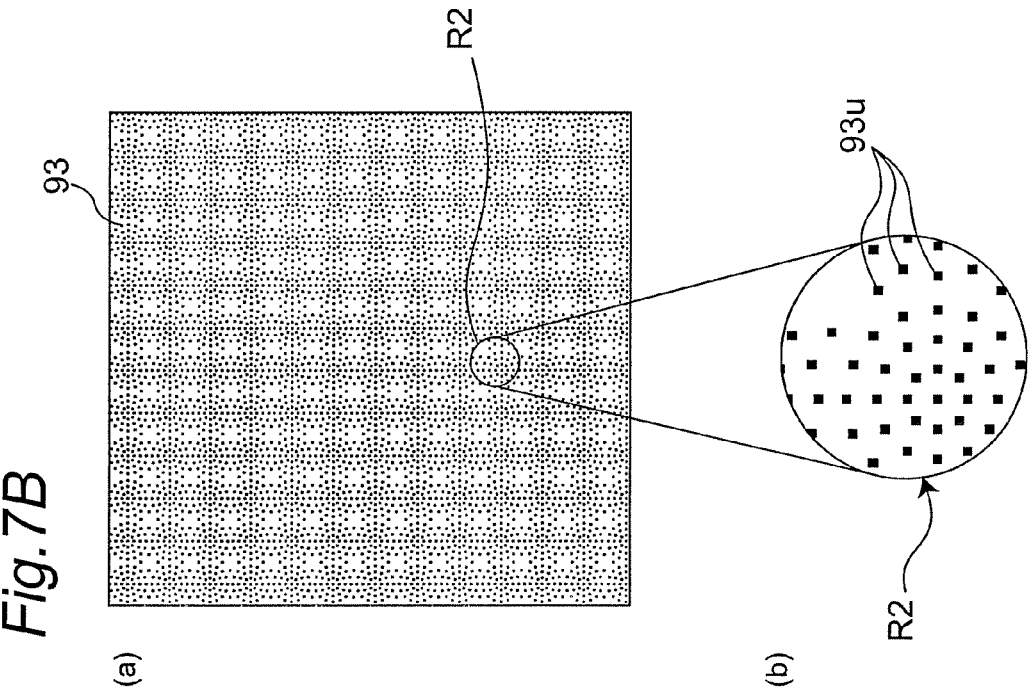
FIGS. 7A and 7B are diagrams of examples of the background patterns and constitutional units of the background pattern with different density.
Figure 7B:
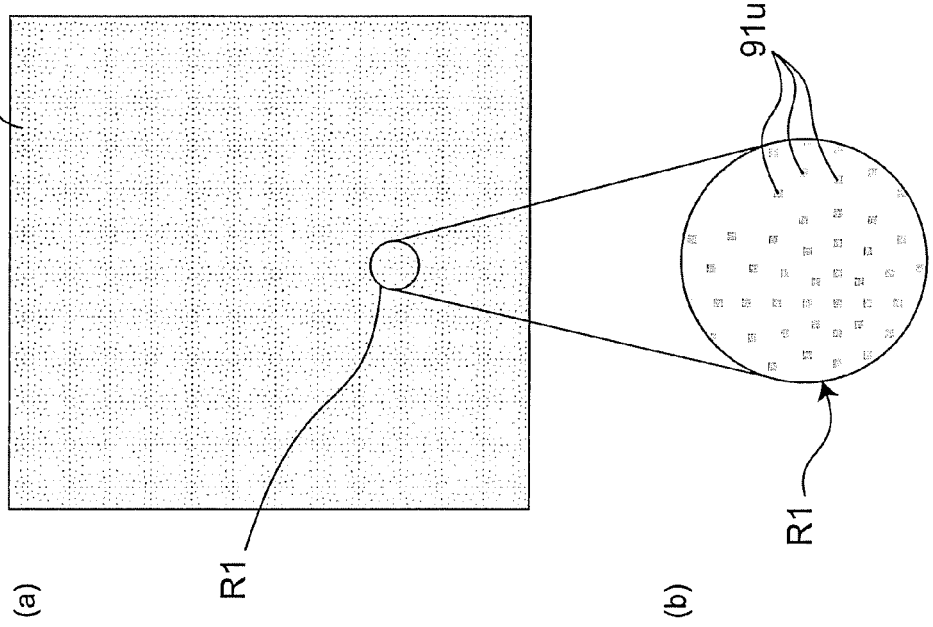

FIGS. 7A and 7B are diagrams of examples of the re-embedding background pattern.

FIG. 7A is a diagram of a first density background pattern 91, and FIG. 7B is a diagram of a second density background pattern 93 having higher density than that of the first density background pattern 91. FIG. 7A(b) and FIG. 7B(b) are respectively expanded partial views of a region R1 and a region R2.

When FIGS. 7A(b) and 7B(b) are referenced, it is found that each of the first and second density background patterns 91 and 93 is constituted by background pattern constitutional units 91*u* or 93*u*, which are units to constitute the background pattern. In the second density background pattern 93, the second density background pattern constitutional units 93$u$ are formed with higher density than those of the first density background pattern constitutional units 91$u$. It is advantageous for embedding the background pattern in the document image having dense background color to form a background pattern using background pattern constitutional units having higher density. It is to be understood that three or more kinds of background pattern constitutional units each having different density may be provided and may be properly used for re-embedding the background pattern. At this time, the background pattern constitutional units having lower density than the normal density may also be prepared.

FIG. 8 is a histogram for explaining an example of the original document image analysis performed cooperatively by an erase processing unit 41 and the central processing unit 2.

The erase processing unit 41 analyzes the RGB data received from the scanner unit, and calculates a luminance of each pixel of the original document image using a prescribed calculation formula. Each of luminance values thus calculated is counted for every luminance value, and is represented in a histogram. In this example, the luminance value is shown as a value having an 8-bit gradation. However, the number of gradations of the luminance value is not particularly limited to the 8-bit, and it may be an arbitrary number of bits. The luminance value may be obtained through converting each pixel value of the RGB of the corresponding pixel into the luminance value using a well-known calculation formula. Then, a luminance distribution diagram of the entire original document image may be represented as the histogram.

As to evaluation of the original document image, a method in which a histogram of luminance values for a predetermined region of the document is prepared may be used as well as the aforementioned method. Furthermore, the histogram may not be prepared, if the characteristics of the document image can be derived by using a well-known statistical method. Also, a method in which the density of the original document image is estimated and evaluated by using pixel value information of only one color out of the RGB may be used. This is because the pixel values of RGB colors are substantially identical in the case of a black and white document.

Using the histogram prepared, the central processing unit 2 obtains a relation of a predetermined threshold value TH and the peak in the histogram. In the example shown in FIG. 8, the peak P1 of the luminance histogram is at left of the threshold value TH. This shows that relatively many pixels of low (dark) luminance are included in the original document image.

Figure 9:
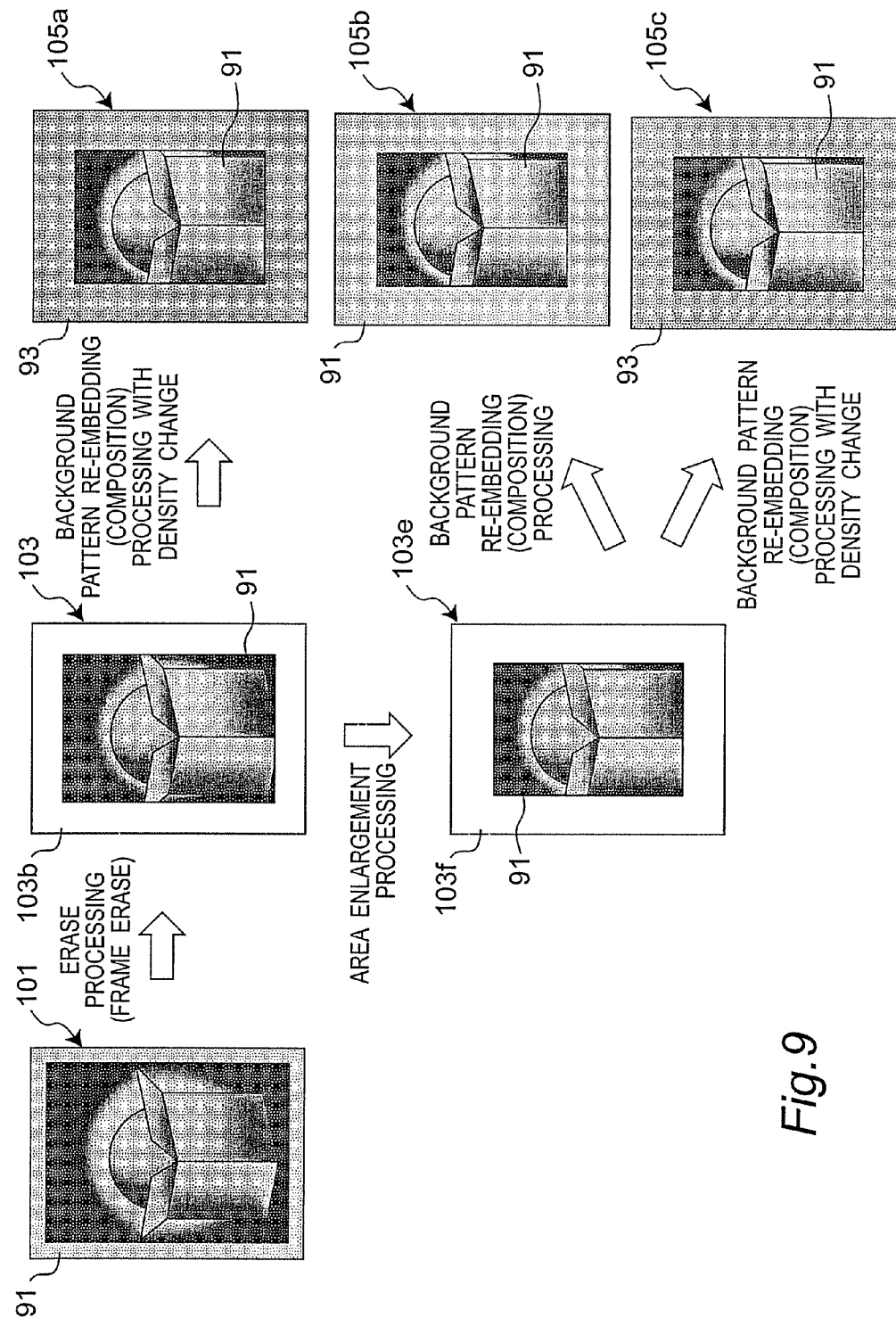
FIG. 9 is a diagram of an example of the background pattern re-embedding processing in which the density of the background pattern constitutional units is changed.

FIG. 9 is a diagram schematically illustrating re-embedding process of background pattern in an original document which exhibits such image characteristics.

The original document data (scanned image) 101 including the background pattern 91 undergoes erase processing (frame erase) by the erase processing unit 41. An upper stage of the central part in the figure shows the erase-processed document image data 103.

The original document image data 101 is a document exhibiting the image characteristics shown by the histogram of FIG. 8. In this case, the central processing unit 2 recognizes the original document image data 101 as the image having relatively low luminance, changes the density of the re-embedding background pattern to a higher density than normal, and can execute re-embedding the background pattern.

An upper stage at the right side in FIG. 9 shows re-embedded document image data 105$a$ in which the background pattern having second density is re-embedded. In the re-embedded document image data 105$a$, the peripheral edge part has been erase-processed. The background pattern 93 including the background pattern constitutional units having higher density than those in the original document image data 101 is embedded in the peripheral edge part that has undergone the erase processing. Therefore, the detection rate of the background pattern of the re-embedded document image data 105$a$ can be made higher than that of the original document.

In addition, the central processing unit 2 can give an instruction to the erase processing unit 41 to make the width of the blank area 103$f$ formed in the erase processing to be broader than or equal to the width of a normal erase processing. Such an enlarged-erase-processed document image data 103$e$ that has undergone erase area enlargement processing is shown in a lower stage of the central part of the figure.

Thus, when it is determined that the density of the background color of the original document is higher than a predetermined value, the central processing unit 2 can make the width of the blank area 103$f$ formed in the erase processing to be larger than normal, for the purpose of maintaining the detection rate of the background pattern.

The enlarged-erase-processed document image data 103$e$ has a sufficient blank area 103$f$ in the periphery wider than that of a normal erase processing. Therefore, when the re-embedding background pattern has a normal density, a sufficient detection rate of the background pattern can be secured.

Re-embedded document image data 105$b$ is shown at the middle stage of the right side of FIG. 9, which is generated in the case where the central processing unit 2 instructs the re-embedding background pattern generating unit 9 and the background pattern composition processing unit 71 to execute the re-embedding of the background pattern using background pattern constitutional units of normal density.

In addition, the central processing unit 2 can also instruct the re-embedding background pattern generating unit 9 and the background pattern composition processing unit 71 to re-embed the background pattern using background pattern constitutional units of higher density than normal in the enlarged-erase-processed document image data 103$e$, which has undergone area enlargement processing. Re-embedded document image data 105$c$ generated in that case is shown at a bottom stage of the right side of FIG. 9.

Thus, the MultiFunction Peripheral 1 according to the present invention can re-embed the background pattern varying the density of the background pattern constitutional unit which constitutes the background pattern based on the image characteristics (such as luminance distribution) of the original document. Also, the MultiFunction Peripheral 1 according to the present invention can make the width of the area regarding the erase processing to be larger than its normal setting, based on the image characteristics. Both functions contribute to improvement of the detection rate of the background pattern.

Figure 10:
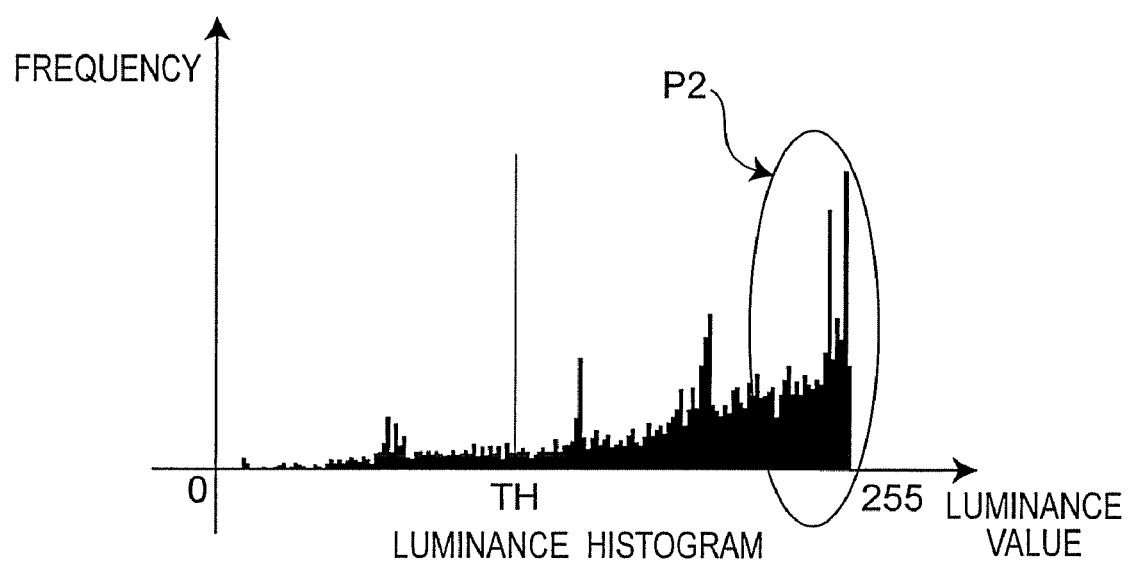
FIG. 10 is a diagram of an example of the luminance value histogram used in the document image characteristic analysis.

FIG. 10 is a luminance histogram regarding an original document different from that shown in FIG. 9. In this case, the peak of the histogram exists at the right side of the threshold value TH, namely, in the higher luminance side (brighter side). In such a case, the MultiFunction Peripheral 1 can be set so as not to execute re-embedding of the background pattern. Because it is highly probable that an image having many high luminance pixels may be a document having faint background color, and in such a case, it is determined that a sufficient background pattern detection rate can be secured without the background pattern re-embedding operation in the erased area.

Figure 11:
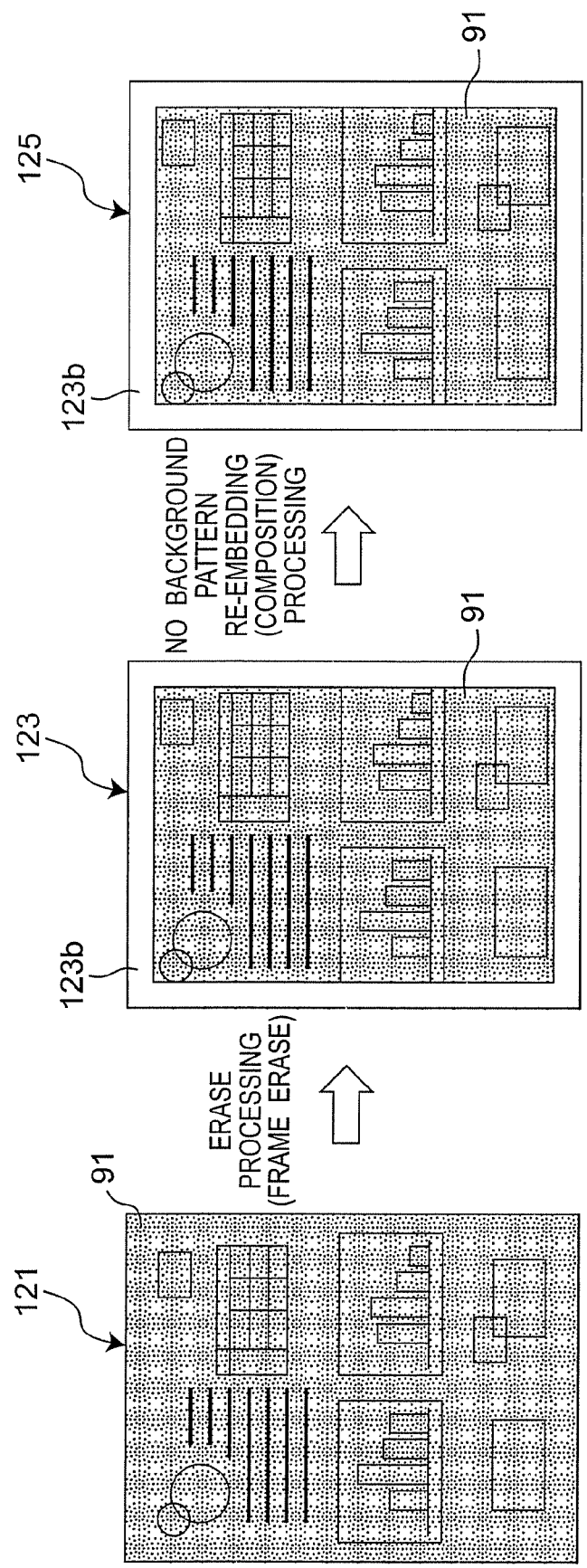
FIG. 11 is a diagram of an example of the case where it is determined based on the document image characteristics that the background pattern re-embedding processing is not executed.

FIG. 11 is a diagram schematically illustrating processes from its erase processing to output regarding the original document having the document image characteristics shown in FIG. 10.

The central processing unit 2 prepares the histogram of the original document image data 121 (FIG. 10) in cooperation with the erase processing unit 41. The erase processing unit 41 performs the erase processing to prepare erase-processed document image data 123 having a blank area 123b.

The peak P2 of the histogram (FIG. 10) exists at the right side of the threshold value TH. Therefore, the central processing unit 2 determines that the background color of the original document be relatively faint, and does not execute the re-embedding of the background pattern in the case where the setting of the re-embedding of the background pattern is set as automatic, and outputs the erase-processed document image data 123 as it is as re-embedded document image data 125.

Figure 12:
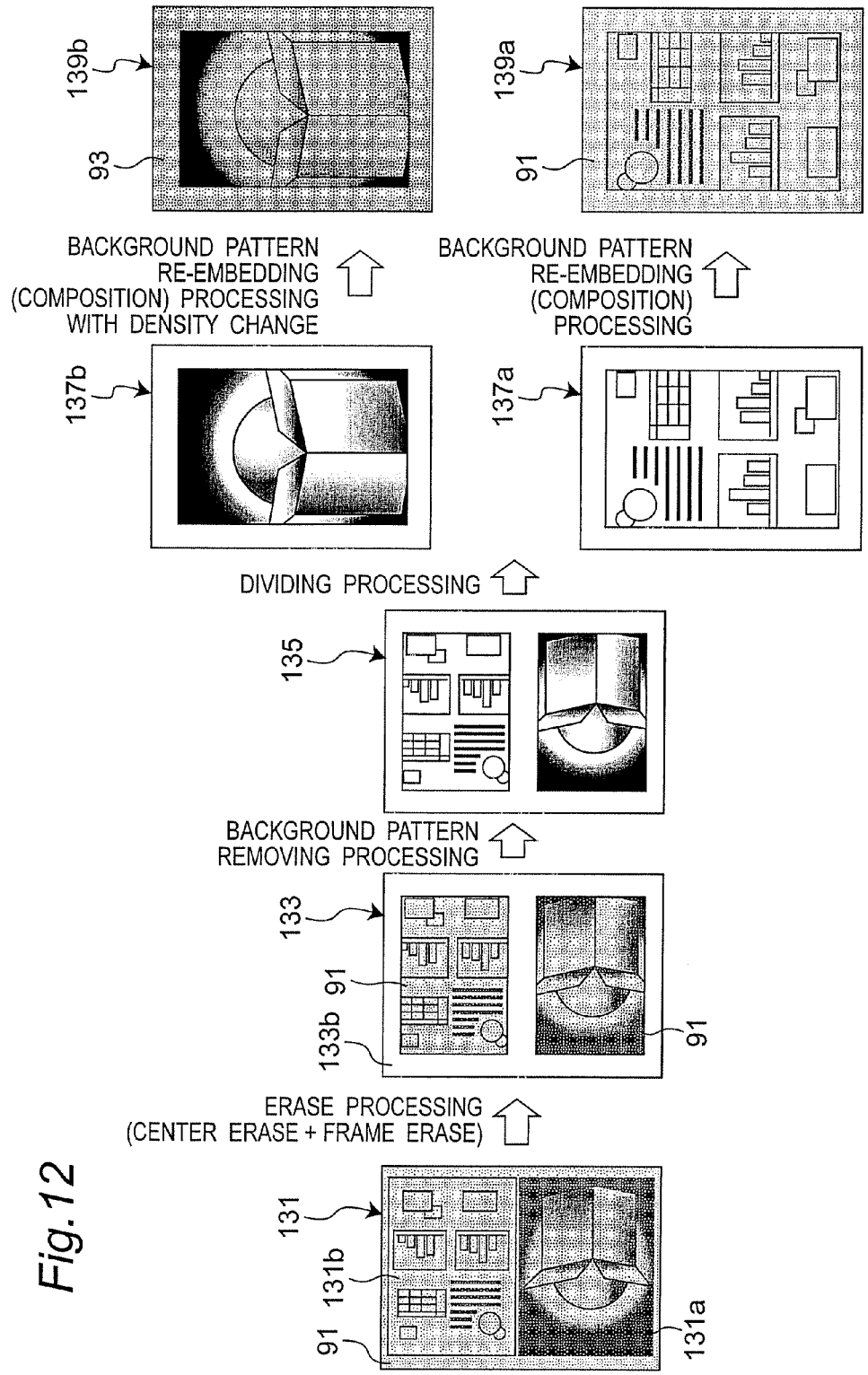
FIG. 12 is an outline diagram of the erase processing, dividing processing, and the background pattern re-embedding processing.

FIG. 12 is a diagram illustrating the background pattern re-embedding process in the present invention in the case where dividing processing is executed in combination. Here, the dividing processing includes the process wherein an image of one page of the original document is copied and outputted as two or more pages of document images by using proper enlargement process in combination.

The erase processing unit 41 applies the center erase processing and the frame erase processing to the original document image data 131 to prepare erase-processed document image data 133. At the same time, the central processing unit 2 perform evaluations of the image characteristics for each of an original document image 131a for the first page and an original document image 131b for the second page, separately, in cooperation with the erase processing unit 41.

The original document image 131a for the first page shows the document image characteristics like the histogram shown in FIG. 8, and the original document image 131b for the second page shows the document image characteristics like the histogram shown in FIG. 10.

Next, the erase processing unit 41 performs the processing of removing the background pattern 91 which is included in the erase-processed document image data 133 to prepare background pattern removed document image data 135. Although this background pattern removing processing is not indispensable, it is effective in realizing a high quality output.

Next, the image compositing unit 71 prepares two page document image data 137a and 137b from the background pattern removed document image data 135. Then, the image compositing unit 71 executes the background pattern re-embedding for the document image data 137a of the first page and for the document image data 137b of the second page, on the basis of results of image characteristics analysis regarding the document image 131a of the first page and the document image 131b of the second page, respectively.

Here, re-embedding of the background pattern 91 formed of the background pattern constitutional units 91u of normal density is performed into the re-embedded document image data 139a of the first page, and the background pattern 93 formed of the background pattern constitutional units 93u of the density higher than the normal density is performed into the re-embedded document image data 139b of the second page.

Thus, in the MultiFunction Peripheral 1 of the present invention, even when the dividing processing is used in combination, the document image analysis is executed for every region each constituting a page after division, and based on this analysis result, the density of the background pattern is corrected, to thereby realize an improvement of the background pattern detection rate. In addition, as a matter of course, the enlargement processing of an erased area can be executed separately.

Figure 13:
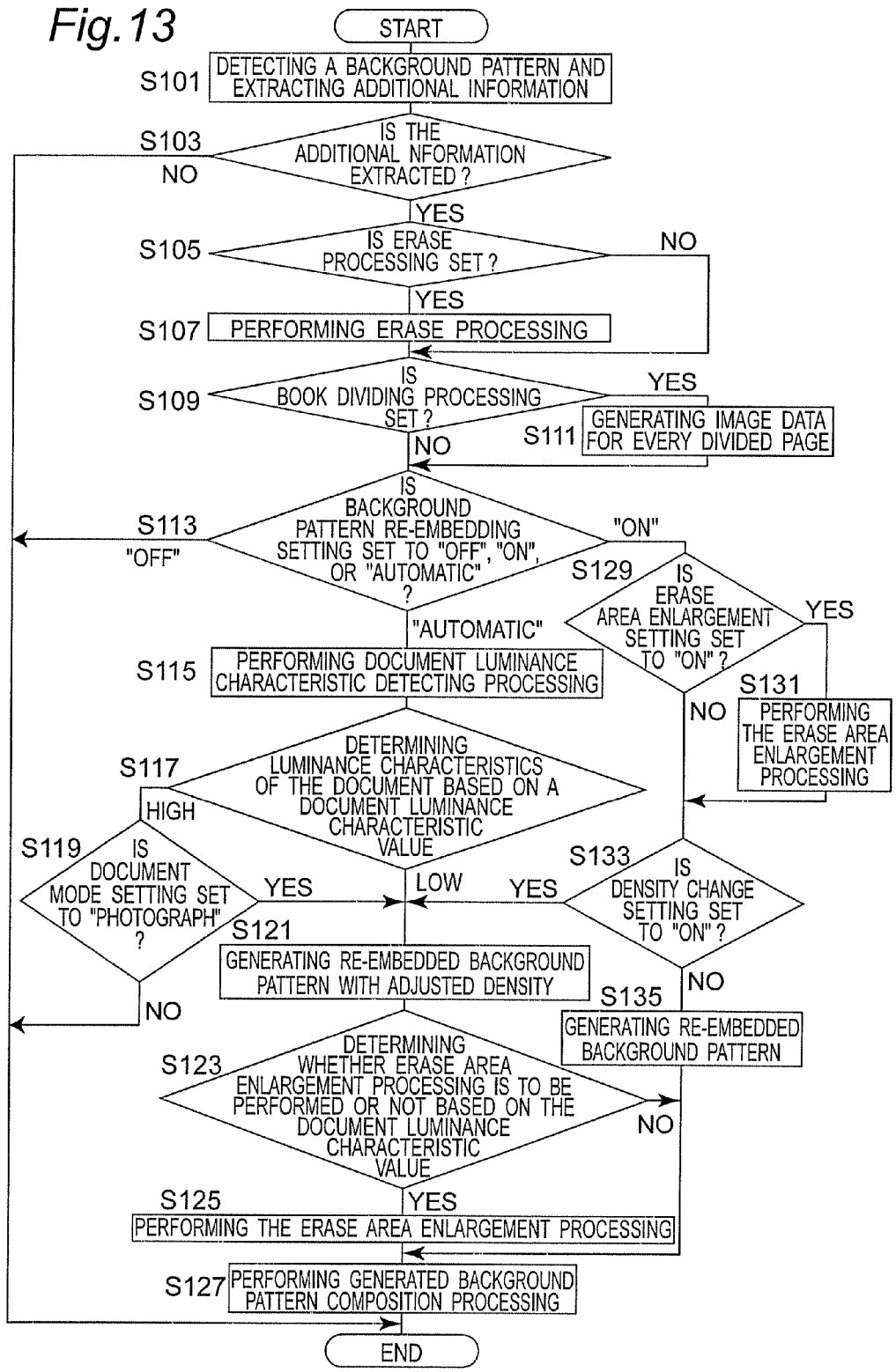
FIG. 13 is a flowchart of the processing according to the present invention.

FIG. 13 is a flowchart of the background pattern re-embedding processing according to the present invention.

In step S101, the specific pattern detecting unit 51 and the information detecting unit 53 of the MultiFunction Peripheral 1 detects the background pattern from the RGB image data of the original document which is received from the scanner unit, and if the background pattern is detected, extracts the additional information represented thereby, and sends a detection result and the content of the additional information to the central processing unit 2.

In step S103, the central processing unit 2 determines whether or not the specific pattern detecting unit 51 detects the background pattern from the original document. When the central processing unit 2 determines that the background pattern is detected ("YES" in step S103), the processing is advanced to step S105, and when the central processing unit 2 is determines that the background pattern is not detected ("NO" in step S103), the processing according to the present invention is terminated.

In step S105, the central processing unit 2 determines whether or not the erase processing is set with respect to the copying of the original document. When the central processing unit 2 determines that the erase processing is set ("YES" in step S105), the processing is advanced to step S107, and when the central processing unit 2 determines that the erase processing is not set ("NO" in step S105), the processing is advanced to step S109.

In step S107, the erase processing unit 41 applies the erase processing to an area of normal width.

In step S109, the central processing unit 2 determines whether or not a (book) dividing processing is set. When the central processing unit 2 determines that the (book) dividing processing is set ("YES" in step S109), the processing is advanced to step S111, and when the central processing unit 2 determines that the (book) dividing processing is not set ("NO" in step S109), the processing is advanced to step S113.

In step S111, divided image data for every page is prepared to perform dividing processing of the original image. Along with this processing, the erase processing such as the center erase may be executed.

In step S113, the central processing unit 2 determines whether background pattern re-embedding setting (corresponding to "security background pattern re-embedding setting" in FIGS. 6A and 6B) is "ON", "OFF", or "AUTOMATIC", and in a case of "OFF" ("OFF" in step S113), the processing of the present invention is ended, in a case of "AUTOMATIC" ("AUTOMATIC" in step S113), the processing is advanced to step S115, and in a case of "ON", the processing is advanced to step S129.

In step S115, the central processing unit 2 applies the processing of detecting the document luminance characteristics as to each of the document images constituting one page.

In step S117, the central processing unit 2 determines whether or not the luminance of the document is high on the basis of the document luminance characteristics detected in step S115. Specifically, the histogram of the luminance is prepared and high/low of the luminance of the document is determined from high/low of its peak to a prescribed threshold value. When the central processing unit 2 determines that the luminance of the document is high ("YES" in step S117), the processing is advanced to step S119, and when the central processing unit 2 determines that the luminance of the document is low ("NO" in step S117), the processing is advanced to step S121.

In step S119, the central processing unit 2 determines whether or not a "photograph" is selected for the original document's image quality mode. In the present invention, when the original document is the "photograph," setting is made to execute the background pattern re-embedding even if the luminance of the image of the original document is high. This setting rule is based on the factual knowledge that the background pattern detection rate in a "photograph" is relatively low. Thus, an improvement of the background pattern detection rate in the "photograph" can be expected.

In step S121, in cooperation with the re-embedding background pattern generating unit 9, the central processing unit 2 determines, based on the document luminance characteristics, the density of the background pattern constitutional units to be used in the background pattern re-embedding, and generates the re-embedding background pattern. In this step, in the case where the processing is directly moved from step S117 to this step, the background pattern constitutional unit density to be used is preferably set to be higher than the normal density. Meanwhile, in the case where the processing is moved from step S117 through step S119 to this step, the background pattern constitutional unit density to be used may be the normal density or lower density than the normal density.

In step S123, the central processing unit 2 determines whether or not an area of the erase processing, namely, the size of the blank area generated by the erase processing should be enlarged from its normal size. In this determination also, for example, the analysis based on the histogram shown in FIG. 8 or FIG. 10 can be used. When the central processing unit 2 determines that the size should be enlarged ("YES" in step S123), the processing is advanced to step S125, and when the central processing unit 2 determines that the size may not be enlarged ("NO" in step S123), the processing is advanced to step S127.

In step S125, in cooperation with the erase processing unit 41, the central processing unit 2 applies the erase processing to the document image wherein the area undergoing the erase processing is enlarged more than the normal.

In step S127, in cooperation with the background pattern composition processing unit 71, the central processing unit 2 applies composition processing of the re-embedding background pattern to the document image, and outputs the document image data.

Next, the flow of the processing in the case where the background pattern re-embedding setting is "ON" is described.

In step S129, the central processing unit 2 determines whether or not the erase area enlargement processing setting (corresponding to the "re-embedding area enlargement" in FIG. 6A and FIG. 6B) is set to "ON" or "OFF". In the case of "ON" ("YES" in step S129), the processing is advanced to step S131, and in the case of "OFF" ("NO" in step S129), the processing is advanced to step S133.

In step S131, in cooperation with the erase processing unit 41, the central processing unit 2 applies the erase processing to the document image, in which the erased area is widened than the normal.

In step S133, the central processing unit 2 determines whether the density change setting (corresponding to "security background pattern density change" in FIG. 6A and FIG. 6B) is "ON" or "OFF." In the case of "ON" ("YES" in step S133), the processing is advanced to step S121. In the case of "OFF" ("NO" in step S133), the processing is advanced to step S135.

In step S135, in cooperation with the re-embedding background pattern generating unit 9, the central processing unit 2 generates the background pattern of normal density.

As described above, the MultiFunction Peripheral 1 according to the present invention executes the re-embedding processing, by which the background pattern damaged through the erase processing is embedded into the document again, based on a variety of settings previously set by an operator and the image characteristics regarding the image of one page of the document to be outputted. At the same time, the re-embedding background pattern has an optimal density determined on the basis of the image characteristics of the document, and therefore the background pattern detection rate of more than that of the original document can be achieved. In addition, for the purpose of improving the background pattern detection rate, by executing processing of the enlargement of the area to be erased, further improvement of the background pattern detection rate can be expected.

Next, a modified example of the document image characteristics analysis which can be performed by the central processing unit 2 will be described. The MultiFunction Peripheral 1 has a scanner for three colors such as RGB (red, green, blue). Therefore, in the scanning of a full color document, lightness information regarding each color of R, G, and B can be obtained. Such lightness information is stored for each pixel, as a pixel value for each color of RGB.

In this example, the central processing unit 2 of the MultiFunction Peripheral 1 prepares a histogram of the pixel value for each color of red color, green color, and blue color, estimates a dominant color tone in the full color document, and, based on this estimation, corrects the density and color tone of the background pattern constitutional units to be used in the background pattern re-embedding.

Figure 14A:
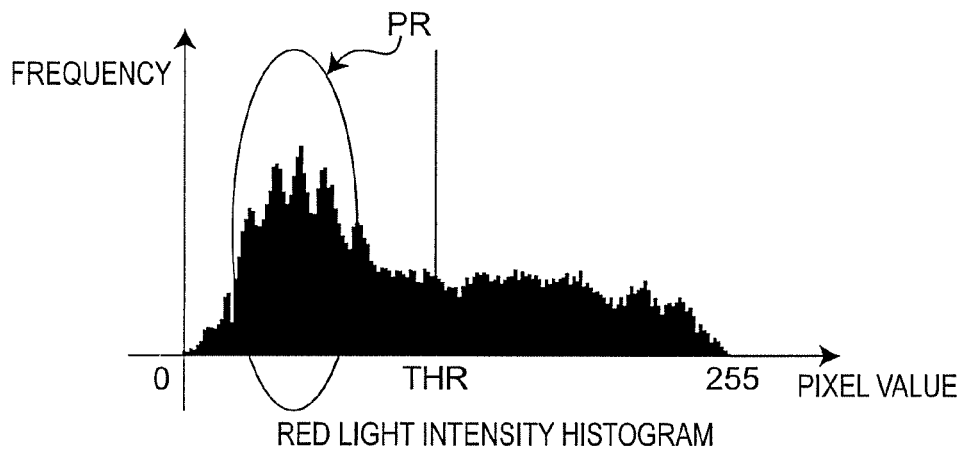
FIG. 14A is a pixel value histogram regarding a red color pixel.
Figure 14B:
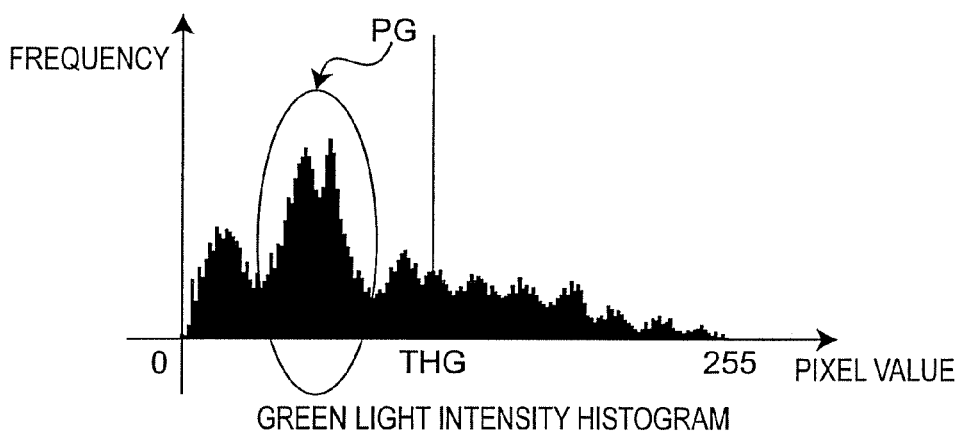
FIG. 14B is a pixel value histogram regarding a green color pixel.
Figure 14C:
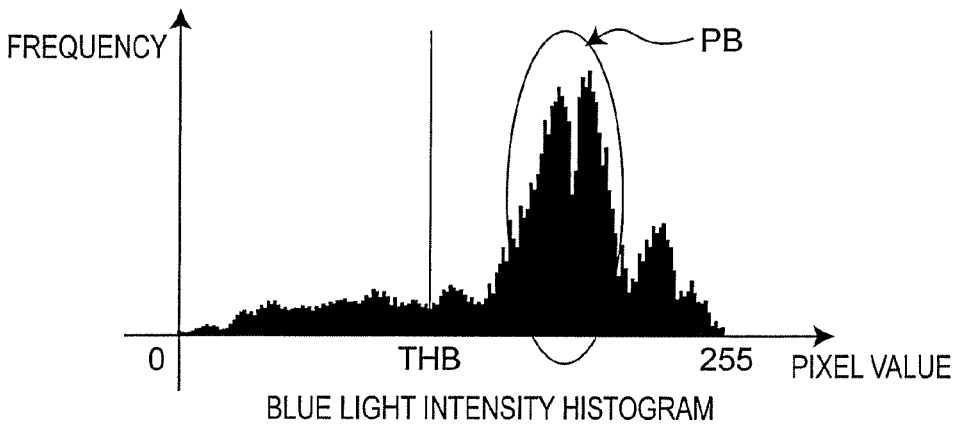
FIG. 14C shows a pixel value histogram regarding a blue color pixel.

FIGS. 14A, 14B, and 14C are histograms of the pixel values regarding red color, green color, and blue color, respectively.

In this example, the pixel values of red color pixels of FIG. 14A have the peak PR in the pixel value lower than the red color threshold value THR, and the pixel values of green color pixels of FIG. 14B have the peak PG in the pixel value lower than the green color threshold value THG, and the pixel values of blue color pixels of FIG. 14C have the peak PB in the pixel value higher than the blue color threshold value THB.

Based on the histograms of the pixel values for such three colors of RGB, the central processing unit 2 can determine the density and color tone of the background pattern constitutional units. For example, the central processing unit 2 can select a color tone of the background pattern constitutional units, which is in a complementary color relationship with the color tone estimated on the basis of the peaks of histograms of three colors of RGB, and can select a density of the background pattern constitutional units on the basis of the luminance derived from the pixel values of three colors of RGB using the prescribed calculation formula.

Thus, the MultiFunction Peripheral 1 configured in this way can output a full color document having a background pattern detection rate equal to or higher than that of the original document. This is preferable in information managing such as a management of information security.

Note that, in the embodiments above, examples of restoring the background pattern by using the background pattern re-embedding processing, which is damaged through the erase processing, are described. However, according to the background pattern re-embedding processing, the background pattern which is lost due to a curl of a selvage of the original document during scanning of the original document or due to a punched hole formed in the original document can be re-embedded again into the document. Technical methods of detecting the pattern formed by the curl of the selvage and of detecting the pattern formed by the punched hole during scanning are easy matters for a person skilled in the art. Hence, specific descriptions thereof are omitted here.

Further, the present invention is not limited to the embodiments, but various variations and modifications may be made without departing from the scope of the present invention.

The present invention relates to an image processing apparatus. The image processing apparatus of the present invention can embed a background pattern damaged through the erase processing during copying operation into the document again with an optimal density and/or color tone, and output the document. Hence, the image processing apparatus of the present invention is a useful image processing apparatus. The image processing apparatus of the present invention may be a MultiFunction Peripheral having a copying function, for example. The present invention is also applicable to a computer program stored on a computer readable medium such as a flexible disk (FD), a compact disc read only memory (CD-ROM), or the like. The computer program may also be provided through a telecommunication line including a public line or a private line.

What is claimed is:

1. An image processing apparatus comprising:
a specific pattern detecting unit that detects a background pattern representing additional information from inputted original document image data;
an information detecting unit that extracts the additional information represented by the background pattern which is detected by said specific pattern detecting unit;
an erase processing unit that erases a prescribed region of the original document image and outputs erase-processed document image data;
a re-embedding background pattern generating unit that generates a re-embedding background pattern representing the additional information extracted by said information detecting unit;
a background pattern composition processing unit that embeds the re-embedding background pattern into a blank area of the erase-processed document image data and outputs re-embedded document image data; and
a processor that is connected so as to transmit and receive data to/from said specific pattern detecting unit, said information detecting unit, said erase processing unit, said re-embedding background pattern generating unit, and said background pattern composition processing unit, and controls said specific pattern detecting unit, said information detecting unit, said erase processing unit, said re-embedding background pattern generating unit, and said background pattern composition processing unit.

2. The image processing apparatus according to claim 1, wherein said processor controls operations of said re-embedding background pattern generating unit and said background pattern composition processing unit based on image characteristics of the original document image data.

3. The image processing apparatus according to claim 2, wherein said re-embedding background pattern generating unit changes a density of the re-embedding background pattern based on the image characteristics of the original document image data.

4. The image processing apparatus according to claim 2, wherein:
said processor controls an operation of said erase processing unit based on the image characteristics of the original document image data; and
said erase processing unit changes a size of the prescribed region to be erased based on the control of the operation by said processor.

5. The image processing apparatus according to claim 2, further comprising an input unit that receives an instruction of an operator, and
wherein said processor controls the operations of said re-embedding background pattern generating unit and said background pattern composition processing unit based on an image quality mode of the original document image data which the operator inputs through said input unit.

6. The image processing apparatus according to claim 2, wherein:
said erase processing unit executes dividing processing to prepare data corresponding to two pages or more from data corresponding to one page of the original document image data; and
said processor controls the operations of said re-embedding background pattern generating unit and said background pattern composition processing unit based on image characteristics of an image of data corresponding to one page which is included in the data corresponding to the two pages or more.

7. An image processing method, comprising:
detecting a background pattern representing additional information from inputted original document image data;
extracting the additional information represented by the detected background pattern;
erasing a prescribed region of the original document image and generating erase-processed document image data;
generating a re-embedding background pattern representing the additional information; and
embedding the re-embedding background pattern in a blank area of the erase-processed document image data and outputting re-embedded image data.

8. The image processing method according to claim 7, wherein said generating the re-embedding background pattern and said embedding the re-embedding background pattern are performed based on image characteristics of the original document image data.

9. The image processing method according to claim 8, wherein said generating the re-embedding background pattern changes a density of the re-embedding background pattern based on the image characteristics of the original document image data.

10. The image processing method according to claim 8, wherein said erasing the prescribed region changes a size of the prescribed region to be erased based on the image characteristics of the original document image data.

11. The image processing method according to claim 8, further comprising receiving an instruction of an operator, and
wherein said generating the re-embedding background pattern and said embedding the re-embedding background pattern are performed based on an image quality mode of the original document image data which is inputted by the operator in said receiving the instruction of the operator.

12. The image processing method according to claim 8, wherein:
said erasing the prescribed region includes executing dividing processing to prepare data corresponding to two pages or more from data corresponding to one page of the original document image data; and said generating the re-embedding background pattern and said embedding the re-embedding background pattern are performed based on image characteristics of an image of data corresponding to one page which is included in the data corresponding to the two pages or more.

13. A non-transitory computer readable medium storing an image processing computer program for re-embedding a background pattern in image data inputted into an image processing apparatus which includes the computer comprising:

code that detects a background pattern representing additional information from inputted original document image data;

code that extracts the additional information represented as the background pattern detected by said specific pattern detection;

code that erases a prescribed area of the original document image and outputs erase-processed document image data;

code that generates a re-embedding background pattern representing the additional information extracted by said additional information extraction; and code that embeds the re-embedding background pattern in a blank area of the erase-processed document image data and outputs re-embedded document image data.

14. The non-transitory computer readable medium according to claim 13, wherein said re-embedding background pattern generation and said re-embedding background pattern embedment are executed based on image characteristics of the original document image data.

15. The non-transitory computer readable medium according to claim 14, wherein said re-embedding background pattern generation changes a density of the re-embedding background pattern based on the image characteristics of the original document image data.

16. The non-transitory computer readable medium according to claim 14, wherein said prescribed region erasure changes a size of the prescribed region to be erased based on the image characteristics of the original document image data.

17. The non-transitory computer readable medium according to claim 14, further comprising code that receives an instruction of an operator, and wherein said re-embedding background pattern generation and said re-embedding background pattern embedment are performed based on an image quality mode of the original document image data which is inputted by the operator in said reception of the instruction of the operator.

18. The non-transitory computer readable medium according to claim 14, wherein:

said prescribed region erasure includes executing dividing processing to prepare data corresponding to two pages or more from data corresponding to one page of the original document image data; and said re-embedding background pattern generation and said re-embedding background pattern embedment are performed based on image characteristics of an image of data corresponding to one page which is included in the data corresponding to the two pages or more.

19. The image processing apparatus according to claim 2, the image characteristics of the original document image data includes luminance or density of an image based on the original document image data.

20. The image processing apparatus according to claim 1, wherein a background pattern detection rate of the re-embedded document image data is equal to or higher than a background pattern detection rate of the original document image data.

21. The image processing method according to claim 8, wherein the image characteristics of the original document image data includes luminance or density of an image based on the original document image data.

22. The image processing method according to claim 7, wherein a background pattern detection rate of the re-embedded document image data is equal to or higher than a background pattern detection rate of the original document image data.

23. The non-transitory computer readable medium according to claim 15, wherein the image characteristics of the original document image data includes luminance or density of an image based on the original document image data.

24. The non-transitory computer readable medium according to claim 14, wherein a background pattern detection rate of the re-embedded document image data is equal to or higher than a background pattern detection rate of the original document image data.

* * * * *